Sept. 10, 1963    W. B. M. CLARK    3,103,657
TEMPERATURE INDICATOR
Filed Aug. 22, 1958    4 Sheets-Sheet 1

INVENTOR.
WINSLOW B. M. CLARK
BY
Edwin Coates
- ATTORNEY -

Sept. 10, 1963

W. B. M. CLARK 3,103,657

TEMPERATURE INDICATOR

Filed Aug. 22, 1958

INVENTOR.
WINSLOW B. M. CLARK
BY
Edwin Coates
·ATTORNEY·

Sept. 10, 1963 W. B. M. CLARK 3,103,657
TEMPERATURE INDICATOR
Filed Aug. 22, 1958 4 Sheets-Sheet 4

Fig. 5.

INVENTOR.
WINSLOW B. M. CLARK
BY
Edwin Coates
-ATTORNEY-

United States Patent Office 3,103,657
Patented Sept. 10, 1963

3,103,657
TEMPERATURE INDICATOR
Winslow B. M. Clark, Van Nuys, Calif., assignor to Douglas Aircraft Company, Inc., Santa Monica, Calif.
Filed Aug. 22, 1958, Ser. No. 756,630
6 Claims. (Cl. 340—317)

This invention is concerned with aircraft and particularly relates to means for accurately and flexibly registering or indicating varying temperatures of the ambient atmosphere as the aircraft traverses various altitudes.

Although temperature registration, especially in "test" airplanes, is commonplace, it is equally true that heretofore the apparatus that had to be carried to measure these gradients was for one reason or another, apparently necessarily bulky, complex, heavy and unreliable, and could not be mounted in "spare" space either in the temperature pick-up surface or airfoil carrier therefor, in the pilot's cockpit, or on the already overcrowded instrument panel.

By means of a novel construction, layout and combination of pick-up, transmission, control and indicating components, the present invention combines such general temperature monitoring systems in the one system and in the form of a few relatively light, simple and compact components, so that "spare" space can be used thereby, and even including mounting it in a hitherto unusable corner of the instrument panel.

Essentially, the invention combines, in a novel manner, with an airplane's surface that is exposed to ambient atmosphere and with the instrument panel in the fuselage, an ambient air temperature responsive thermo-electric pick-up means carried in an exposed position on said surface; means conducting the signal from the pick-up means to a control unit in an out-of-the-way place in the cockpit or on the instrument panel, and an "error"-signal actuated temperature indicating means connected to the control unit and located, if desired, in a corner of the panel.

This indicating means, contrary to the usual one, is not broad-faced or extensive on the face of the panel, but is axially elongate with a very small frontal, or indicating area, a consequence of a novel "linear," or in-line, rearrangement of novel electrical components of the indicator, also partly resultant, however, from the novel construction of the control unit.

In one specific embodiment of these concepts, the arrangement comprises, exposed to the airstream, an electrical-signal producing temperature sensing means for producing a direct current; means conducting the signal to a special control unit for converting the D.C. to A.C., amplifying this A.C. signal and feeding it onwardly, and a novel, "in-line" temperature indicating means connected to the amplified signal. In the in-line configuration of this last means is a small electric motor which drives a sprocket drum. One bight or loop of an endless, temperature-registering band rides around this drum, and the other end of this band is supported by a second sprocket drum, which the band drives. A null-seeking potentiometer is driven by the second drum and the potentiometer output is fed back into a feed-back loop in the indicator's electrical system so as to balance out the signal from the ambient temperature pick-up means.

Other novelties will be either made manifest, or become apparent, hereinafter.

The apparatus of this invention is illustrated in the accompanying drawings and described hereinafter in conjunction therewith, but it is to be understood that the invention also contemplates any variant or modification of the particular physical article illustrated that lies within the scope of the appended claims.

In these drawings,

FIG. 3 is a rear perspective view of the small control unit per se;

Figure 1:
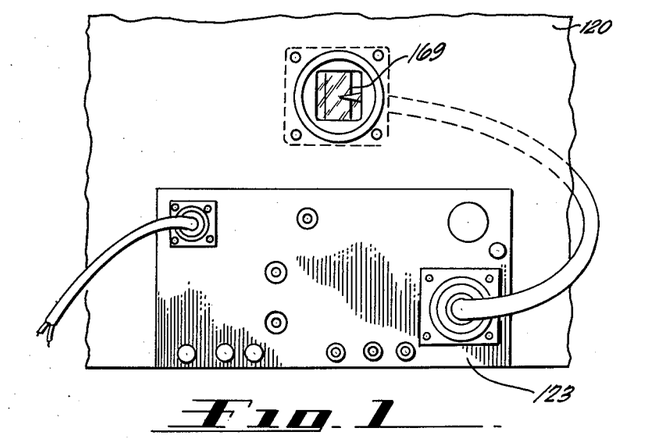
FIG. 1 is a front view of a portion of an airplane's instrument panel that includes the present control unit and the smaller indicating instrument.
Figure 5:
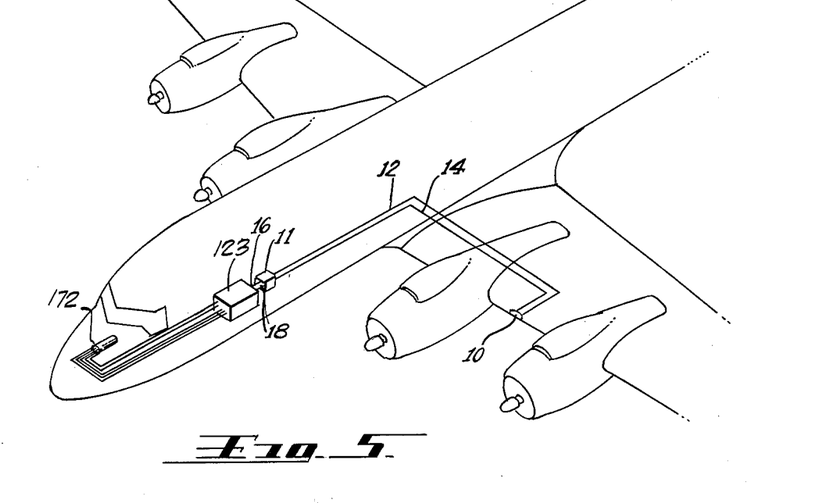
FIG. 5 is a fragmentary perspective of the system as installed in an airplane.

The system as a whole is shown schematically and electrically in FIG. 5, but FIG. 1 illustrates strikingly the relatively small area of an airplane's instrument panel required for the two components of the system which must be mounted on or adjacent such panel. Even the control unit, however, does not necessarily require mounting on the panel as it could well be mounted on the sides of the cockpit or underneath the floor thereof, leaving only the indicator per se, of necessity mounted to the panel for ready visibility. Even so, it will readily be perceived that the vertical and lateral extent of the panel's face which is occupied by the instrument is limited to the dial area, the remainder of the indicator extending fore-and-aft behind this panel, where space is not at a premium.

In FIG. 5 is shown a preferred, but not limiting, embodiment of the present invention. Herein the invention is used for the monitoring of the ambient temperature conditions encountered on exposed aircraft surfaces. Typically, for such a use, a pick-up 10 comprised of two different runs of material 12, 14 is mounted in an exposed position in the surfaces, such as one of the wings, as shown in FIG. 5. The runs 12, 14 are joined to copper conductors 16, 18 at a reference point 11. The conductors 16, 18 conduct the signal developed by the pick-up 10 to a control unit 123. Said unit 123 operates upon the signal sufficiently to enable the signal to operate an indicator unit 172 electrically connected thereto.

Figure 4:
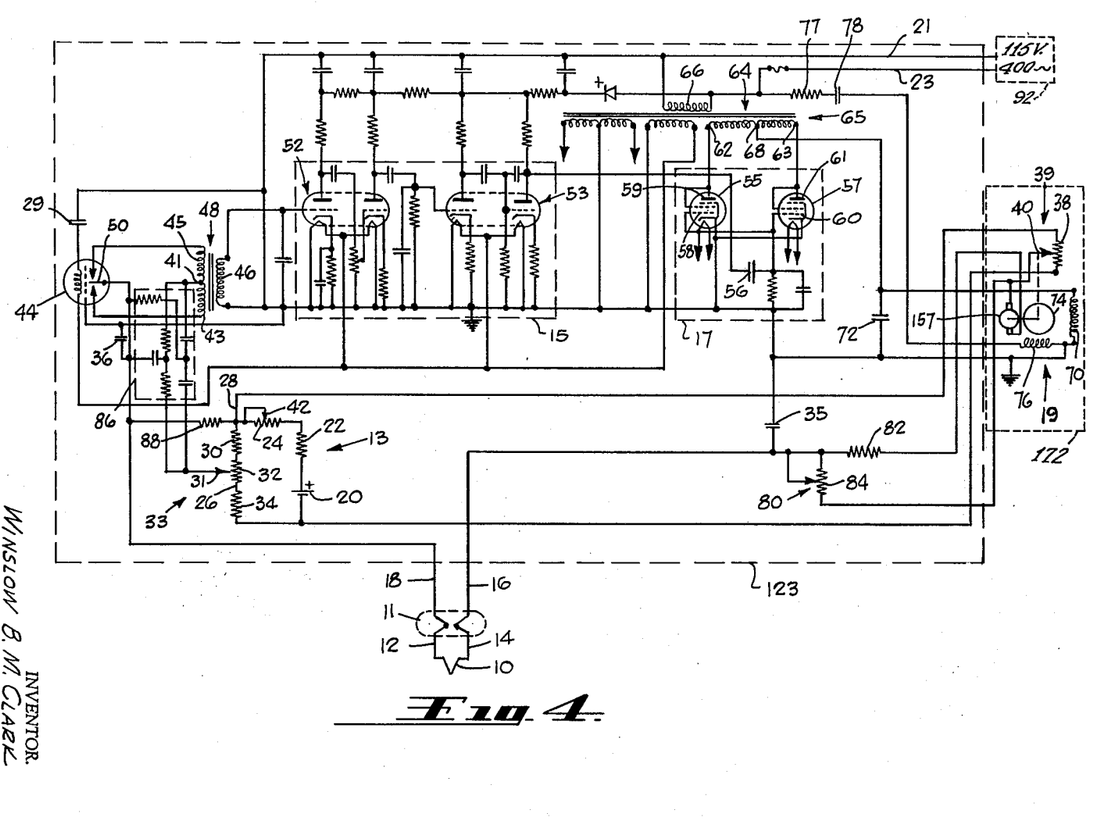
FIG. 4 is a diagrammatic layout of the complete circuitry of the entire system, including the pick-up, control unit and indicator unit.

Referring now to FIG. 4 there is shown schematically an embodiment of the present invention adapted to measure the output of thermocouple pick-up 10. A change in the output of the thermocouple pick-up 10 will result in an unbalance between the thermocouple output and the potentiometric measuring circuit 13. This unbalance is amplified by means of an electronic amplifier 15 which is operative to impress the signal upon the input of a motor drive circuit 17. The motor drive circuit operates selectively in accordance with the phase and magnitude of the signal, to energize a two-phase reversible induction rebalancing motor 19, driving it in a direction and to the extent necessary to bring the measuring circuit into balance with the thermocouple output.

Figure 2:
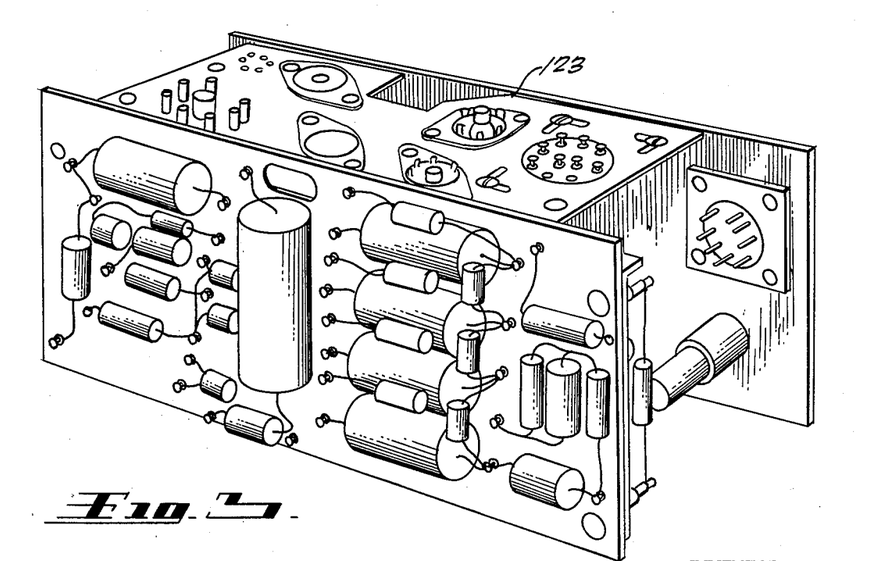
FIG. 2 is an enlarged view of the indicator per se, the view being in phantom and fragmentary perspective.

In FIGS. 2 and 3 the indicator unit 172 and the control unit 123 are shown in assembly detail and will be described in electrical detail in connection with FIG. 4. Referring now to FIG. 4 the unitary system is shown in its electrical entirety in FIG. 4, and there comprises first, a pick-up 10 of the thermocouple variety composed of two different runs of materials, 12, 14. Runs 12, 14 are dissimilar thermo-electric conductors, joined to copper conductors 16, 18 at a reference point 11. Said point 11, is maintained at a fixed reference temperature. Since point 11 is at a fixed temperature, a thermo-electric, D.C. potential will be impressed from 16 to 18, directly correlated with the temperature of the airstream impinging upon the thermocouple pick-up 10. The dissimilar thermo-electric conductors are connected in such manner that when the pick-up senses a temperature which is above the fixed reference temperature, the electrical potential which is generated by the thermocouple, appearing at 16, is positive in polarity with respect to 18. If the sensed temperature is less than the reference temperature the polarity of this potential is reversed.

The magnitude of this potential, and thus the magnitude of the temperature of the airstream, is measured in a self-balancing, potentiometric manner as further described.

A D.C. voltage source shown as a battery 20, having a fixed and known magnitude, supplies current through a fixed resistor 22 and a span control rheostat 24 to first and second parallel resistor branches 26 and 28, respectively. The first branch 26 includes resistors 30, 32, and 34 serially connected. Resistor 32 has a sliding contact 31, and is called the zero adjustment potentiometer 33. The second branch 28 consists of a resistor 38 having a sliding contact 40. The common voltage drop across these parallel branches is set, by manually adjusting the sliding contact 42 of the span control rheostat 24, to a magnitude of fixed proportion corresponding to the total change in voltage from 16 to 18 when the pick-up 10 is subjected consecutively to temperatures representing both extremities of a desired temperature measuring range.

Resistor 38 together with its sliding contact 40 are mechanically arranged as a component commonly called a null-seeking, multi-turn potentiometer 39. Several revolutions of the driving shafts of this assembly cause the sliding contact 40 to move from one end to the other end of resistor 38.

Thus, from the foregoing it can be understood that a discrete rotary motion of the driving shaft of this potentiometer 39 will cause potentials to appear between sliding contacts 40 and 31. The total change in these potentials is made to equal the change appearing between 16 and 18 as pick-up 10 is exposed to temperatures bounded by the upper and lower limits of the desired range.

A means of measuring the output potential of pick-up 10, and hence its temperature, is provided by comparing this unknown output with the known potential appearing between sliding contacts 40 and 31. If the comparison is unequal, the system recognizes this error and moves contact 40 to a position where the comparison is equal, achieving a state of balance between the unknown output of the pick-up and the known output of the potentiometer 39.

As the temperature of pick-up 10, and accordingly its potential output, changes, so will the position of contact 40 to continuously maintain a state of balance, or zero difference, between the unknown and known potentials. Thus, the position of sliding contact 40, and therefore the position of the band 144, FIG. 2, which is mechanically coupled thereto, as will be described further, will be a measure of the temperature of pick-up 10.

To effect this mode of operation, any unbalance between the known and unknown voltages will result in their difference appearing as a D.C. voltage between 41, the center-tap of the primary of an input transformer 48, and 50, the moving contact of the chopper 44. Interaction of a permanent magnetic field in the chopper and the alternating field in the chopper coil causes the moving contact to oscillate from one stationary contact to the other and back to the first, for one complete cycle of the A.C. supply voltage on leads 21, 23 from the A.C. power source 92, FIG. 4. This switching action thus impresses the D.C. difference, or error voltage, first on one-half, 45, and next on the other half, 43 of the primary of the input transformer 48.

This action results in an A.C. voltage in the secondary 46 with an amplitude proportional to the D.C. error signal impressed on the primary, and with a frequency equal to that of the power source entering at 21, 23. The condenser 29 in series with the chopper coil has such value for that one polarity of D.C. error signal appearing between 50 and 41, the resulting A.C. voltage on secondary winding 46 is in phase with respect to the supply voltage. When the D.C. error signal is of opposite polarity, the voltage on secondary 46 will be 180 degrees out of phase with respect to the supply voltage.

Thus, if the temperature of the thermocouple produces a voltage greater than that of the D.C. measuring circuit 13, an in-phase A.C. voltage will appear at secondary 46. If the thermocouple voltage is less than that of the measuring circuit, an out-of-phase (by 180 degrees) will result at secondary 46.

This inversion of a D.C. error signal to a phase changing A.C. error signal is made in order to use an A.C. amplifier instead of a D.C. amplifier to obviate the instability and zero drifting characteristics of the latter.

As will be described further, the A.C. error signal is amplified to a level to operate a two-phase motor 19 mechanically coupled to the sliding contact 40, a rate generator 157 and the temperature band 144, FIG. 2. Rotation of the motor then moves the sliding contact 40 in a direction to achieve balance between the unknown thermocouple voltage and the calibrated known voltage between slider 40 and contact 31. At balance, no D.C. error exists and consequently no A.C. error exists. The moving system is then at rest, and indicates the correct temperature.

The A.C. error voltage output of the transformer secondary 46 is connected to the first stage 52 of a conventional four-stage R-C coupled, voltage electronic amplifier 15. The operation of the amplifier will not be described because it is conventional and known generally in the art.

The last stage 53 of the voltage amplifier is coupled to the input of a conventional motor drive circuit 17. The motor drive circuit 17 employs two pentode electronic tubes 55, 57, which have been connected as triodes, as amplifying elements. As shown, the output of the voltage amplifier 15 is coupled through a coupling capacitor 56 to the grids 58, 60 of the tubes. The plates 59, 61 of the electronic tubes 55, 57 respectively, are coupled to opposite ends 62, 63 of a section of the secondary 64 of a power transformer 65, which has its primary winding 66 connected to conductors or leads 21, 23. The secondary also has a center tap 68 connected through the motor control winding 70 to ground.

A condenser 72 is connected in parallel with the motor control winding 70. The condenser is selected with respect to the motor control winding 70 so as to form therewith a substantially parallel resonant circuit at the frequency of motor operation.

In addition to the motor control winding 70, the two-phase reversible induction motor 19 includes a rotor 74 and a power winding 76. The power winding 76 of the motor is connected in series with a condenser 78 and a resistor 77. The condenser and resistor are selected with respect to the power winding 76 so as to form therewith a substantially series resonant circuit at the frequency of the A.C. power source 92, FIG. 4. The direction of rotation of the two-phase reversible induction motor 19 depends upon the phase relationship between the current in the motor power winding 76 and the current in the motor control winding 70. If the current in the control winding leads the current in the power winding by approximately 90° the motor will turn in one direction. If, on the other hand, the current in the control winding lags the current in the power winding by approximately 90° the motor will turn in the other direction. As mentioned above the motor power winding 76 is connected in series with condenser 78 and resistor 77 across the alternating current conductors 21 and 23. In operation the power winding is continuously energized by current from the said conductors. As a result of the substantially series resonant circuit formed by the capacitor 78 and resistor 77, and the motor power winding 76, the current in the power winding is substantially in phase with the voltage across the conductors 23, 21.

To obtain a current in the control winding 70, either leading or lagging the current in the motor power winding 76 in order to cause the rotor 74 to move in the proper direction to achieve balance, the following action takes place.

For a given polarity of D.C. error signal appearing between moving contact 50 and center tap 41, a corresponding, amplified A.C. error signal will be present at the common grids 58, 60 in the motor drive circuit 17. For ease of explanation, assume that the phase of this A.C. error signal is such that the common grids 58, 60 are positive with respect to conductor 21. During this same time, assume that plate 59 is positive with respect to conductor 21. Then plate 61 is negative with respect to conductor 21 because of the manner of connections to the power transformer secondary terminals 62 and 63. Thus, pentode 55 only will conduct because its plate and grid are both positive with respect to its cathode, whereas pentode 57 will not conduct during the same time period, because its plate is negative even though its grid is positive with respect to its cathode.

The resulting current flowing from secondary terminal 62 through pentode 55, into the parallel circuit of control winding 70 and condenser 72 and back to center tap 68 will result in a voltage across the control winding that is in phase with respect to supply voltage from 23 to 21. Since the motor control winding 70 is substantially inductive the current will lag in the control winding and consequently the supply voltage approximately 90 degrees.

Conditions for producing rotation of motor rotor 74 are therefore established, and the system is moved into balance.

If the system goes out of balance in the opposite direction, the reverse action takes place with pentode 57 only conducting, resulting in a control winding current leading that of the power winding and causing the rotor 74 to move in the opposite direction to achieve balance in the system.

As seen in FIG. 2, the rotor 74 of the rebalancing motor 19 is operative through the linkage 79 to drive a continuous band 144 and rotate the shaft 160 of the multi-turn potentiometer 39 thereby positioning the contact 40 (FIG. 4).

Referring now to FIG. 2, the operation of the indicator unit 172 together with its corresponding linkage 79 will be described in detail. The linkage is mounted within an elongated cylindrical casing 100. One end of the case is hermetically sealed by a rectangular face plate 141. Said face plate contains a window 169 for viewing the continuous band 144. The other end of the casing is sealed by a cap 166. Extending through the cap are an electrical connector 167 for connecting the remote indicator unit 172 to the control unit 123, and an evacuation tube 168.

After the face plate and cap have been sealed to the casing, the air within the cylinder, formed by sealing the face plate and cap to the casing, is evacuated by suitable means (not shown) through tube 168, and helium gas is introduced into the cylinder through said tube. Subsequently thereto the tube is sealed, and the indicator unit will operate within an atmosphere of helium. The substitution of helium for air dissipates the heat generated by operation and prolongs the life of the metallic and elastomeric part of the unit.

Contained within said cylinder and attached to cap 166 are a plurality of elongated bars 164. Said bars are attached by conventional means at their extremity to a plate 140 and contain intermediate to their extremities a mounting bracket 161. All of the components of the unit 172 are mounted on the bars and associated plate and bracket. In this fashion by removing the cap, rearwardly from in contact with the casing, all of the components of the unit can be removed integrally from the casing. Said cap 166, elongated bars 164 and plate 140 comprise an elongated supporting member.

Mounted fore and aft of the elongated region defined between the plate 140 and cap 166 are a first and second sprocket drums 137 and 153, respectively. The first drum 137 is mounted on a gear-driven shaft 138 which is supported by tabs 139 extending from plate 140 toward the front face 141. The shaft 138 contains a driven bevel gear 136 which engages a driver bevel gear 135 mounted on the extremity of the rotor 74 of the rebalancing motor 19. The second drum 153 is mounted on the shaft 160 of the multi-turn potentiometer 39. Passing over the first and second drums is a continuous band 144 provided with successive sprocket holes 163 therein which are drivingly engaged by the plurality of teeth 170 extending outwardly around the periphery of said drums. Thus, the rotation of the first drum 137 imparted to it by operation of the rebalancing motor 19 results in a corresponding rotation of the second drum 153 and multi-turn potentiometer 39.

Adjacent to said second drum 153 and mounted on the bracket 161 is a rate generator 157. Secured respectively to the shafts 160 and 165 of the potentiometer 39 and the rate generator 157 are pulleys 154 and 158. Passing over said pulleys is an endless drive belt 156. The tension of the drive belt is such that the rotation imparted to the potentiometer 39 by the band 144 will likewise rotate the shaft of the rate generator 157.

To prevent the first drum 137 from rotating through more than three revolutions, first, second, and the third L-shaped latch keys 145, 146 and 147 respectively are mounted on shaft 138. To restrain the rotation of the first drum, a pin 148 extending outward from the face of the first drum contacts the first latch key 145 during the first revolution of the drum causing the latch key to rotate with the pin. During the second rotation of the drum, the first latch key 145 contacts the second key 146 and causes it to rotate with the first key and the drum. In a similar fashion, the third latch key 147 is contacted by the second during the third rotation of the drum. At the end of the third rotation, the third latch key 147 contacts a pin 149 which extends through the tab 139 into the path of rotation of the key and prevents the drum from further rotation in that direction. In a similar fashion, as the drum is rotated in the opposite direction, the pin 148 first contacts the first key and picks it off the stack of keys. Thereafter, during the next two rotations of the drum, the second and third keys are picked off and stacked against the pin 149 at the end of the third revolution of the drum.

To produce a means of indicating the temperature surrounding the pick-up 10, the continuous band 144 is graduated on an appropriate scale. A rotation of the rotor of the rebalancing motor 19 through the operation of the motor drive circuit 17 and potentiometric measuring circuit 13 will cause the band to stop with a portion of the scale visible through window 169. To accurately indicate a point on the band, an index pointer or arrow 150 is attached to one of the tabs 139. Said arrow has a point which extends indicatingly to the edge of the first drum 137.

The aforementioned components of the indicator unit are configured to occupy relatively small lateral and vertical dimensions, being intentionally arranged, one behind another, in longitudinally rather extensive configuration so as to occupy the minimum possible area of the instrument panel 120 and extending a far greater distance longitudinally of the airplane's cockpit or compartment than laterally or vertically thereof. Thus, to the best of my knowledge, for the first time such ambient atmospheric temperature indicators can be efficiently and accurately mounted on a panel 120 within the confines of an airplane's compartment where space is at a premium.

The aforedescribed "linear" assembly is circumscribed by, and mounted in, a cylindrical, elongate casing 100 as shown, and occupies, at the most, only about three inches of lateral or vertical space in the cockpit or on the instrument panel yet quite clearly, accurately and substantially infallibly indicates temperature gradients of minute incremental values.

In series with the measuring circuit 13 and the pick-up 10 is a rate generator 157 (FIG. 4). As described above, the rate generator is mechanically coupled to the multi-turn potentiometer 39. The rate generator is of the permanent magnetic field type and generates a D.C. voltage which is directly proportional to the speed of rotation of the generator armature. Coupled to the generator is a voltage divider circuit 80. Said circuit consists of a resistor 82 in series with the generator 157 and a rheostat 84 across the output of the generator. By proper adjustment of the rheostat, the output of the generator can be regulated.

To facilitate a clearer understanding of the function of the generator, the operation of the system will first be described without the generator. Without the generator 157, for a given gain in the amplifier, the motor drive shaft circuit causes the motor 19 to rotate. Because of this rotation, momentum is developed by the motor rotor. Therefore, although the signal in the amplifier goes to zero, the indicator will overshoot because of the motor momentum. It is the function of the rate generator to cut off the driving torque of the motor sooner by actually introducing a reverse torque which slows the motor down. Therefore, by proper adjustment of the signal generated by the rate generator 157 by adjusting the rheostat 84, the indicator can be made to come to rest without overshooting.

To make the device operative for different thermocouple materials and temperature ranges, the battery 20 is coupled in series with a span control rheostat 24. For any thermocouple material and range, span control rheostat 24 can be adjusted so that the output of battery 20 equals the change in millivolts caused by consecutively subjecting the thermocouple to temperatures at the extremes of the desired range.

To provide a means of zeroing the device, a zeroing potentiometer consisting of a resistor 32 and a sliding contact 31 is connected in branch 26 of the measuring circuit 13. To zero the device, the thermocouple pick-up 10 is subjected to a known temperature and zeroing potentiometer 33 is adjusted until the band 144 has revolved to enable the pointer 150 to indicate the known value of the temperature surrounding the pick-up.

In order to assure the elimination of noise-producing A.C. from the signal produced by a grounded pick-up, filtering ground-circuit capacitors 35, 36 are interposed between the copper conductors 16, 18 respectively, and the electrical ground.

In the event that the pick-up 10 should burn out or break, resulting in an open circuit, indication of this failure is obtained through bias resistor 88. An open pick-up causes a small voltage to appear between moving contact 50 and center tap 41. The magnitude of this voltage is controlled by the resistive value (normally quite high) of bias resistor 88. This voltage, when amplified as described before, causes the motor to run and move the band to one of its extremities since the balancing voltage from contact 40 is no longer present because of the open circuit.

In order to assure that only the designed frequency of signal will be supplied to the voltage amplifier, a conventional parallel-T filter 86 is provided in the input circuit to center-tap 41 and moving contact 50. The filter has the form of a conventional A.C. bridge and by proper selection of capacitors and resistors, it will appear as an infinite impedance to the undesired frequencies that may be induced in the pick-up runs 12, 14.

The foregoing description has shown that by mounting the thermocouple pick-up 10 in the leading edge portion of the wing, or the edges of the vertical stabilizer or middle section, there is produced an instantaneous visual indication of a temperature obtaining at a desired point on the airplane. Thus, the instantaneous value will always be visible and will require no interpretation interpolation, or extrapolation.

Usage of certain specific nomenclature, parameters, dimensions, shapes and compositions has been made in the foregoing specific description solely in order to render the same more concrete and in no wise constitutes a limitation upon the scope of the concepts herein except insofar as the ambit of the annexed claims may require.

I claim:
1. In an aircraft that includes a cockpit having a fore and aft axis, the combination of:
   an instrument panel having an opening therein restricted to a minimum expanse, said panel having a lateral extent restricted by the confines of the cockpit, and the cockpit imposing a lesser restriction on instrument quantity fore and aft of the aircraft than laterally of the craft;
   an elongated supporting member mounted on said panel and having a fore and aft axis extending coaxially of said opening;
   an electric motor mounted on said supporting member adjacent to said panel and having a longitudinal output shaft parallel with the fore and aft axis of said supporting member;
   a voltage generating means mounted on said supporting member rearwardly of and in juxtaposition with said motor and adapted to develop an output voltage according to rotation speed of said generating means, said generating means having a longitudinal drive shaft which is substantially at right angles to the fore and aft axis of said supporting member for rotating said generating means;
   a variable resistance means mounted on said supporting member rearwardly of said generating means and having a longitudinal drive shaft which is substantially at right angles to the fore and aft axis of said supporting member, the output voltage of said variable resistance means being dependent on the angular position of its drive shaft;
   means coupling said drive shaft of said resistance means to said drive shaft of said generating means whereby rotation of one drive shaft causes rotation of the other;
   a voltage source adapted to be connected across said resistance means, said resistance means being varied in resistance with rotation of the drive shaft thereof to produce a variable output voltage from said resistance means;
   a first rotation transmitting means mounted on said supporting member forward of said motor in proximity to said opening and adapted to be coupled to the drive shaft thereof for transmitting onwardly therefrom the rotation of said motor;
   a second rotation transmitting means attached to and coaxially circumscribing said resistance means for rotating the drive shaft of said resistance means;
   circuit means for combining the output voltage of said generating means in a relation with the output voltage of said resistance means for slowing rotation of said motor, and comparing the combined output voltages with a signal voltage to produce an error signal;
   means applying said error signal to said motor to cause rotation thereof; and
   an indicating band means interconnecting said first and second rotation transmitting means and rotatable by said motor through said first rotation transmitting means to drive said second rotation transmitting means and the drive shaft of said resistance means in a direction to reduce said error signal to zero, said indicating band means indicating visibly in said opening in said panel and varied in indication according to the rotation of said motor, and said motor, generating means, resistance means, first and second rotation transmitting means, and indicating band means being constrained to occupy a substantially rectilinear and coaxial arrangement with respect to each other.

2. In an aircraft that includes a cockpit having a fore and aft axis, the combination of:

an instrument panel having an opening therein restricted to a minimum expanse, said panel having a lateral extent restricted by the confines of the cockpit, and the cockpit imposing a lesser restriction on instrument quantity fore and aft of the aircraft than laterally of the craft;

an elongated supporting member mounted on said panel and having a fore and aft axis extending coaxially of said opening;

an electric motor mounted on said supporting member adjacent to said panel and having a longitudinal output shaft parallel with the fore and aft axis of said supporting member;

a voltage generating means mounted on said supporting member rearwardly of and in juxtaposition with said motor and adapted to develop an output voltage according to rotation speed of said generating means, said generating means having a longitudinal drive shaft which is substantially at right angles to the fore and aft axis of said supoprting member for rotating said generating means;

a variable resistance means mounted on said supporting member rearwardly of said generating means and having a longitudinal drive shaft which is substantially at right angles to the fore and aft axis of said supporting member, the output voltage of said variable resistance means being dependent on the angular position of its drive shaft;

means coupling said drive shaft of said resistance means to said drive shaft of said generating means whereby rotation of one drive shaft causes rotation of the other;

a voltage source adapted to be connected across said resistance means, said resistance means being varied in resistance with rotation of the drive shaft thereof to produce a variable output voltage from said resistance means;

a first drum rotatably mounted on said supporting member forward of said motor in proximity to said opening and adapted to be coupled to the drive shaft thereof for transmitting onwardly therefrom the rotation of said motor, said first drum having an axis of rotation which is substantially at right angles to the fore and aft axis of said supporting member;

a second drum attached to and coaxially circumscribing said resistance means for rotating the drive shaft of said resistance means, said second drum having an axis of rotation coincident with that of the drive shaft of said resistance means;

circuit means for combining the output voltage of said generating means in a relation with the output voltage of said resistance means for slowing rotation of said motor, and comparing the combined output voltages with a signal voltage to produce an error signal;

means for applying said error signal to said motor to cause rotation thereof; and a continuous indicating band interconnecting said first and second drums and coaxially circumscribing resistance means and said generating means and rotatable by said motor through said first drum to drive said generating means and said resistance means in a direction to reduce said error signal to zero, said indicating band indicating visibly in said opening and varied in indication according to the rotation of said motor, and said motor, generating means, resistance means, first and second drums, and indicating band being constrained to occupy a substantially rectilinear and coaxial arrangement with respect to each other.

3. In an aircraft that includes a cockpit having a fore and aft axis, the combination of:

an instrument panel having an opening therein restricted to a minimum expanse, said panel having a lateral extent restricted by the confines of the cockpit, and the cockpit imposing a lesser restriction on instrument quantity fore and aft of the aircraft than laterally of the craft;

an elongated casing having a normally closed front end attached to edges of said opening, said closed front end including a transparent window therein;

an elongated supporting member having a fore and aft axis and insertable into the rear, open end of said casing and sealable thereto;

an electric motor mounted on said supporting member near the front end thereof and having a longitudinal output shaft parallel with the fore and aft axis of said supporting member;

a voltage generating means mounted on said supporting member rearwardly of and in juxtaposition with said motor and adapted to develop an output voltage according to rotation speed of said generating means, said generating means having a longitudinal drive shaft which is substantially at right angles to the fore and aft axis of said supporting member, for rotating said generating means;

a variable resistance means mounted on said supporting member rearwardly of said generating means and having a longitudinal drive shaft which is substantially at right angles to the fore and aft axis of said supporting member, the output voltage of said variable resistance means being dependent on the angular position of its drive shaft;

drive belt means coupling said drive shaft of said resistance means to said drive shaft of said generating means whereby rotation of one drive shaft causes rotation of the other;

a voltage source adapted to be connected across said resistance means, said resistance means being varied in resistance with rotation of the drive shaft thereof to produce a variable output voltage from said resistance means;

a first sprocket drum rotatably mounted on said supporting member forward of said motor in proximity to said window and having an axis of rotation which is substantially at right angles to the fore and aft axis of said supporting member;

a pointer attached to said supporting member and extending forward of said first sprocket drum;

gearing means coupling the output shaft of said motor to said first sprocket drum for rotating the same;

a second sprocket drum attached to and coaxially circumscribing said resistance means for rotating the drive shaft of said resistance means, said second sprocket drum having an axis of rotation coincident with that of the drive shaft of said resistance means;

circuit means for combining the output voltage of said generating means in a relation with the output voltage of said resistance means for slowing rotation of said motor, and comparing the combined output voltages with a signal voltage to produce an error signal;

means for applying said error signal to said motor to cause rotation thereof; and a continuous indicating band interconnecting said first and second sprocket drums and having holes engaging sprockets thereof, and coaxially circumscribing said resistance means and said generating means and rotatable by said motor through said gearing means to drive said generating means and said resistance means in a direction to reduce said error signal to zero, said indicating band indicating visibly in said window and moved past said pointer positioned cooperatively before said band to provide an indication that is varied according to the rotation of said motor, and said motor, generating means, resistance means, first and second sprocket drums, pointer, and indicating band being constrained to occupy a substantially rectilinear and coaxial arrangement with respect to each other.

4. An indicating means, comprising:

an elongated supporting member having a fore and aft axis;

an electric motor mounted on said supporting member and having a longitudinal output shaft parallel with the fore and aft axis of said supporting member;

a voltage generating means mounted on said supporting member rearwardly of and in juxtaposition with said motor and adapted to develop an output voltage according to rotation speed of said generating means, said generating means having a longitudinal drive shaft which is substantially at right angles to the fore and aft axis of said supporting member for rotating said generating means;

a variable resistance means mounted on said supporting member rearwardly of said generating means and having a longitudinal drive shaft which is substantially at right angles to the fore and aft axis of said supporting member, the output voltage of said variable resistance means being dependent on the angular position of its drive shaft;

means coupling said drive shaft of said resistance means to said drive shaft of said generating means whereby rotation of one drive shaft causes rotation of the other;

a voltage source adapted to be connected across said resistance means, said resistance means being varied in resistance with rotation of the drive shaft thereof to produce a variable output voltage from said resistance means;

a first rotation transmitting means rotatably mounted on said supporting member forward of said motor and adapted to be coupled to the drive shaft thereof for transmitting onwardly therefrom the rotation of said motor;

a second rotation transmitting means attached to and coaxially circumscribing said resistance means for rotating the drive shaft of said resistance means;

circuit means for combining the output voltage of said generating means in a relation with the output voltage of said resistance means for slowing rotation of said motor, and comparing the combined output voltages with a signal voltage to produce an error signal;

means applying said error signal to said motor to cause rotation thereof; and an indicating band means interconnecting said first and second rotation transmitting means and rotatable by said motor through said first rotation transmitting means to drive said second rotation transmitting means and the drive shaft of said resistance means, in a direction to reduce said error signal to zero, said indicating band means being moved to provide an indication that is varied according to the rotation of said motor, and said motor, generating means, resistance means, first and second rotation transmitting means and indicating band means being constrained to occupy a substantially rectilinear and coaxial arrangement with respect to each other.

5. An indicating means, comprising:

an elongated casing having a normally closed front end including a transparent window therein;

an elongated supporting member having a fore and aft axis and insertable into the rear open end of said casing and sealable therewith;

an electric motor mounted on said supporting member near the front end thereof and having a longitudinal output shaft parallel with the fore and aft axis of said supporting member;

a voltage generating means mounted on said supporting member rearwardly of and in juxtaposition with said motor and adapted to develop an output voltage according to rotation speed of said generating means, said generating means having a longitudinal drive shaft which is substantially at right angles to the fore and aft axis of said supporting member for rotating said generating means;

a variable resistance means mounted on said supporting member rearwardly of said generating means and having a longitudinal drive shaft which is substantially at right angles to the fore and aft axis of said supporting member, the output voltage of said variable resistance means being dependent on the angular position of its drive shaft;

means coupling said drive shaft of said resistance means to said drive shaft of said generating means whereby rotation of one drive shaft causes rotation of the other;

a voltage source adapted to be connected across said resistance means, said resistance means being varied in resistance with rotation of the drive shaft thereof to produce a variable output voltage from said resistance means;

a first sprocket drum rotatably mounted on said supporting member forward of said motor in proximity to said window and having an axis of rotation which is substantially at right angles to the fore and aft axis of said supporting member;

a pointer attached to said supporting member and extending forward of said first sprocket drum;

gearing means coupling the output shaft of said motor to said first sprocket drum for rotating the same;

a second sprocket drum attached to and coaxially circumscribing said resistance means for rotating the drive shaft of said resistance means, said second sprocket drum having an axis of rotation coincident with that of the drive shaft of said resistance means;

circuit means for combining the output voltage of said generating means in a relation with the output voltage of said resistance means for slowing rotation of said motor, and comparing the combined output voltages with a signal voltage to produce an error signal;

means applying said error signal to said motor to cause rotation thereof; and a continuous indicating band interconnecting said first and second sprocket drums and having holes engaging sprockets thereof, and coaxially circumscribing said resistance means and said generating means and rotatable by said motor through said gearing means to drive said generating means and said resistance means in a direction to reduce said error signal to zero, said indicating band indicating visibly in said window and moved past said pointer positioned cooperatively before said band to provide an indication that is varied according to the rotation of said motor, and said motor, generating means, resistance means, first and second sprocket drums, pointer, and indicating band being constrained to occupy a substantially rectilinear and coaxial arrangement with respect to each other.

6. An indicating means, comprising:

an elongated casing having a normally closed front end including a transparent window therein;

an elongated supporting member having a fore and aft axis and insertable into the rear open end of said casing and hermetically sealable therewith;

an electric motor mounted on said supporting member near the front end thereof and having a longitudinal output shaft parallel with the fore and aft axis of said supporting member;

a variable resistance means mounted on said supporting member rearwardly of said motor and having a longitudinal drive shaft which is substantially at right angles to the fore and aft axis of said supporting member the output voltage of said variable resistance means being dependent on the angular position of its drive shaft;

a voltage source adapted to be connected across said resistance means, said resistance means being varied in resistance with rotation of the drive shaft thereof to produce a variable output voltage from said resistance means;

a first sprocket drum rotatably mounted on said supporting member forward of said motor in proximity to said window and having an axis of rotation which is substantially at right angles to the fore and aft axis of said supporting member;

a pointer attached to said supporting member and extending forward of said first sprocket drum;

gearing means coupling the output shaft of said motor to said first sprocket drum for rotating the same;

means for limiting rotation of said first sprocket drum to a predetermined number of revolutions;

a second sprocket drum attached to and coaxially circumscribing said resistance means for rotating the drive shaft of said resistance means, said second sprocket drum having an axis of rotation coincident with that of the drive shaft of said resistance means;

circuit means for comparing the output voltage of said resistance means with a signal voltage to produce an error signal;

means for applying said error signal to said motor to cause rotation thereof; and a continuous indicating band carried by said first and second sprocket drums and having holes engaging sprockets thereof, and coaxially circumscribing said resistance means and rotatable by said motor through said gearing means to drive said resistance means in a direction to reduce said error signal to zero, said indicating band indicating visibly in said window and moved past said pointer positioned cooperatively before said band to provide an indication that is varied according to the rotation of said motor, and said motor, resistance means, first and second sprocket drums, pointer, and indicating band being constrained to occupy a substantially rectilinear and coaxial arrangement with respect to each other.

References Cited in the file of this patent

UNITED STATES PATENTS

| | | |
|---|---|---|
| 2,113,164 | Williams | Apr. 5, 1938 |
| 2,593,351 | Shannon | Apr. 15, 1952 |
| 2,640,550 | Knapp et al. | June 2, 1953 |
| 2,641,931 | Wild | June 16, 1953 |
| 2,656,721 | Melchior | Oct. 27, 1953 |
| 2,732,550 | Reedy | Jan. 24, 1956 |
| 2,832,924 | Cilyo | Apr. 29, 1958 |
| 2,855,551 | McCarty | Oct. 7, 1958 |

OTHER REFERENCES

Foster: NACA technical note 3392, 13 pages, April 1955. (Copy in 73–360.)